(12) United States Patent
Wolff et al.

(10) Patent No.: US 11,695,127 B2
(45) Date of Patent: Jul. 4, 2023

(54) BIPOLAR PLATE FOR USE IN A FUEL CELL STACK

(71) Applicant: Airbus Operations GmbH, Hamburg (DE)

(72) Inventors: Christian Wolff, Hamburg (DE); Claus Hoffjann, Hamburg (DE)

(73) Assignee: Airbus Operations GmbH

( * ) Notice: Subject to any disclaimer, the term of this patent is extended or adjusted under 35 U.S.C. 154(b) by 456 days.

(21) Appl. No.: 16/815,211

(22) Filed: Mar. 11, 2020

(65) Prior Publication Data

US 2020/0313203 A1 Oct. 1, 2020

(30) Foreign Application Priority Data

Mar. 29, 2019 (DE) ..................... 10 2019 108 160.2

(51) Int. Cl.
*H01M 8/0258* (2016.01)
*H01M 8/0267* (2016.01)

(52) U.S. Cl.
CPC ....... *H01M 8/0258* (2013.01); *H01M 8/0267* (2013.01)

(58) Field of Classification Search
CPC ............ H01M 8/0258; H01M 8/0267; H01M 8/0263; H01M 2250/20; H01M 8/026; H01M 8/04014; H01M 8/2457; Y02E 60/50; Y02T 90/40
See application file for complete search history.

(56) References Cited

U.S. PATENT DOCUMENTS

| | | | |
|---|---|---|---|
| 6,146,779 A | 11/2000 | Walsh | |
| 2004/0023089 A1* | 2/2004 | Schiegl | H01M 8/0271 |
| | | | 429/465 |
| 2005/0058875 A1* | 3/2005 | Jerome | H01M 8/065 |
| | | | 429/513 |

(Continued)

FOREIGN PATENT DOCUMENTS

| | | |
|---|---|---|
| DE | 19636902 C1 | 4/1998 |
| DE | 102014207594 A1 | 10/2015 |

(Continued)

OTHER PUBLICATIONS

Extended European Search Report including Written Opinion for Application No. EP20165101.5, dated Aug. 25, 2020, 3 pages.

(Continued)

*Primary Examiner* — Muhammad S Siddiquee
(74) *Attorney, Agent, or Firm* — Lerner David LLP

(57) ABSTRACT

A bipolar plate for use in a fuel cell stack includes a first delimiting surface and a second delimiting surface that is arranged parallel to the first delimiting surface, wherein the delimiting surfaces are arranged spaced apart from one another and define an intermediate space, wherein the bipolar plate includes at least one fuel cell section having a flow field that has depressions that protrude into the intermediate space and is provided so as to make direct contact with a fuel cell, and the bipolar plate includes at least one cooling section that extends therefrom along the delimiting surfaces, wherein at least one heat pipe is arranged in the intermediate space and extends so as to transfer heat from the fuel cell section into the cooling section.

15 Claims, 3 Drawing Sheets

(56) References Cited

U.S. PATENT DOCUMENTS

| | | | | |
|---|---|---|---|---|
| 2006/0105213 A1* | 5/2006 | Otsuka | ............... | H01M 8/242 |
| | | | | 429/468 |
| 2009/0142628 A1* | 6/2009 | Okada | ................ | H01M 50/20 |
| | | | | 429/8 |
| 2009/0286115 A1* | 11/2009 | Baumann | ......... | H01M 8/04753 |
| | | | | 429/433 |
| 2013/0207459 A1* | 8/2013 | Schroder | ............ | H01M 10/625 |
| | | | | 307/10.1 |
| 2014/0220471 A1* | 8/2014 | Gambini | .............. | H01M 8/249 |
| | | | | 429/535 |
| 2016/0372765 A1* | 12/2016 | Jones | ............... | H01M 8/04089 |
| 2016/0380279 A1* | 12/2016 | Breit | ....................... | B64C 1/40 |
| | | | | 429/436 |

FOREIGN PATENT DOCUMENTS

| | | | | |
|---|---|---|---|---|
| JP | 6251790 | * | 9/1994 | ............. H01M 8/04 |
| JP | 2004281079 A | | 10/2004 | |

OTHER PUBLICATIONS

Search Report with Written Opinion for German Application No. 102019108160.2 dated Dec. 6, 2019.

* cited by examiner

BIPOLAR PLATE FOR USE IN A FUEL CELL STACK

FIELD OF THE INVENTION

The invention relates to a bipolar plate for use in a fuel cell stack. The invention relates moreover to a fuel cell stack and to a vehicle having a fuel cell stack of this type.

BACKGROUND OF THE INVENTION

Fuel cells for installation in vehicles are frequently realized in the form of fuel cell stacks in which fuel cells are arranged in adjacent rows in alternating polarity and are electrically connected to one another via conductive bipolar plates. The bipolar plates are furthermore used so as to conduct oxygen or air and hydrogen to the fuel cells and have for this purpose a structure of flow channels that are known as "flow fields". Heat is created by way of the fuel cell operation and said heat must be discharged by way of a corresponding cooling procedure. It is necessary in particular in the case of a compact construction of the fuel cells to remove the heat in a reliable manner from the fuel cells in order for said fuel cells to be held at their operating temperature and for them not to exceed said operating temperature and for them as a result to be operated in a reliable manner.

BRIEF SUMMARY OF THE INVENTION

An aspect of the invention proposes an alternative cooling apparatus for a fuel cell, said alternative cooling apparatus to render it possible to cool the fuel cell in a reliable manner even in the case of a compact construction.

A bipolar plate for use in a fuel cell stack is proposed, said bipolar plate comprising a first delimiting surface and a second delimiting surface that is arranged parallel to said first delimiting surface, wherein the delimiting surfaces are arranged spaced apart from one another and define an intermediate space, wherein the bipolar plate comprises at least one fuel cell section having a flow field that comprises depressions that protrude into the intermediate space so as to make direct contact with a fuel cell, and said bipolar plate comprises at least one cooling section that extends therefrom along the delimiting surfaces, wherein at least one heat pipe is arranged in the intermediate space and extends so as to transfer heat from the fuel cell section into the cooling section.

A fuel cell stack is understood to mean an arrangement of multiple fuel cells that are at least electrically connected to one another. The arrangement as a stack is a reliable and simple technical solution in order by way of selecting the number of fuel cells to increase the electrical power that may be generated by the stack. In order to realize this arrangement, individual fuel cells are arranged in rows in alternating polarity. Bipolar plates are located between said rows and although said bipolar plates prevent a fluid connection between adjacent cells they do in fact electrically connect said cells to one another. As a consequence, multiple fuel cells are electrically connected in series and it is possible as required to increase the number of fuel cells by way of adding further fuel cells and bipolar plates.

The bipolar plates are an essential component of such a fuel cell stack. They are to be dimensioned so as to be able to withstand sufficiently high currents and to be sufficiently gas-tight and are also used in accordance with the invention for cooling adjacent fuel cells.

A bipolar plate according to an embodiment of the invention comprises two parallel delimiting surfaces that are to be regarded as the surfaces that are provided on the outside of the bipolar plate and define the actual shape of the plate. The bipolar plates may be approximately circular or square. The spacing between two delimiting surfaces with respect to one another should be as small as possible in order to minimize the plate thickness and consequently also the corresponding dimension of the fuel cell stack. The fuel cell section is to be brought into surface contact with the respective adjacent fuel cells in order to supply the fuel cells with oxygen or air and hydrogen. Simultaneously, each bipolar plate absorbs heat at their fuel cell section and discharges said heat to the cooling section. The heat may be discharged from said cooling section.

The flow field is provided so as to conduct the educts for the fuel cell process from a, by way of example, edge region of the bipolar plate to the fuel cell and to distribute said educts there in a preferably uniform manner. The flow field comprises anode channels on one of the delimiting surfaces and comprises cathode channels on the other delimiting surface. The flow field may comprise a plurality of depressions that are arranged parallel to one another and are separated from one another by way of webs that terminate in the respective delimiting surface or said depressions are formed by way of the webs themselves. Furthermore, the flow field may be delimited by a circumferential and closed web that is arranged on the relevant delimiting surface.

It is preferred that the at least one heat pipe comprises a copper grid that generates a capillary action with respect to a heat transfer medium. Heat pipes of this type are known in particular in electronic technology and in particular in computer technology. The advantage of integrating fuel cells is that it creates the possibility of installing fuel cells in a neutral manner with respect to both their orientation and gravitational force. Furthermore, it is possible to transport the heat transfer medium in a closed space in the form of the tube of the heat pipe without requiring a fluid connection to the environment. In the case of a heat pipe that is integrated in a bipolar plate, an electrical connection to other bipolar plates is consequently avoided. Each heat pipe in a bipolar plate consequently acts as a dedicated, passively operated heat circuit. It is possible thereby to adapt the heat transfer medium for the respective preferred temperature range.

By virtue of integrating the heat pipe into the bipolar plate, this could generally speaking be embodied somewhat thicker than usual. Simultaneously, it is also expedient for the configuration of the bipolar plate to construct the flow fields in such a manner that even in the case of lower input pressures of the educts, by way of example 0.5 to 0.7 bar absolute, practically no power losses occur. This is rendered possible in particular by virtue of the fact that the depressions in the flow fields are sufficiently deep. Since the integration of the heat pipe is associated with a generally speaking greater thickness, the heat pipe and the favourable configuration of the flow fields leads to a lower pressure of the educts being required and thereby a possible reduction in a compressor capacity by way of example for air. The possibly somewhat greater weight of the bipolar plate in accordance with the invention and the possible increase in volume of the fuel cell stack are over-compensated for by the omission of an external cooling system and a lower compressor capacity. In addition, by avoiding the use of pumps and valves for such a cooling circuit, the probability of malfunctions and the costs for maintenance and investment are reduced. As a result, it is possible to increase the serviceable life of a fuel cell system.

In one advantageous embodiment, the cooling section is arranged on one side of the bipolar plate. The cooling effect may consequently be concentrated on an individual spatial region adjacent to an actual fuel cell stack. By virtue of the fact that the cooling section extends on one side, it is also only necessary to provide a single cooling air or cooling medium channel that circulates air or a cooling medium around the individual cooling sections. For this purpose, the cooling sections may preferably be shaped in such a manner as to promote flow.

It is advantageous if the at least one heat pipe runs in a meandering manner in the bipolar plate. As a result, the effective contact surface between the heat-generating material of the bipolar plate and the actual heat pipe is increased in comparison to a heat pipe that runs in a straight line.

However, as an alternative, a considerable section of the at least one heat pipe could extend at least along a straight line. By virtue of the heat pipe running in a straight line, the amount of installation space required by the bipolar plate could be reduced since a heat pipe preferably does not pass over the fuel cell section but rather runs adjacent thereto.

It is likewise conceivable in this case that heat pipes that are arranged in a star-shaped manner are used. A centre of the star may possibly be in a fuel cell section. The centre could be arranged in this case preferably centrally in the relevant fuel cell section.

However, multiple heat pipes could also run in the bipolar plate. Heat pipes that are running in a meandering manner could be mixed with heat pipes are that running in an essentially straight line or multiple heat pipes that run in a meandering manner or multiple heat pipes that run in a straight line could be used.

It is preferred that at least one of the flow fields is embodied so as in the case of an educt pressure in the range of 0.5 to 0.7 bar absolute to supply a fuel cell with an educt. It is therefore not necessary to perform a complex procedure of compressing air as an oxidant. The range of 0.5 to 0.7 bar absolute could render possible the operation by way of example of a fuel cell system on board an aircraft in a non-pressurized region in which air alone is rendered possible from an external air supply. For this purpose, a simple, through-flowing aeration of the cathode side with external air could be possible or the pressure drop between a pressurized region, such as for example an aircraft cabin, and an external region or the environmental air of an aircraft could be sufficient. This aeration procedure could also be performed using an aeration apparatus that is electrically driven or driven in any other manner.

The bipolar plate could be produced in more than one part and by way of a production method whereby material is removed. The production method whereby material is removed may be performed in a simple and efficient manner on an industrial scale Milling or etching procedures are suitable for this purpose. However, the parts that are realized in this manner must be subsequently joined together. This could be performed possibly by a welding procedure, by a bonding procedure that does not influence the electrical conductivity or by a mechanical connection means. It is also conceivable to press two halves of a bipolar plate against one another in a fuel cell stack. In so doing, it is to be ensured that the integrated heat pipe is sealed, so as to prevent the heat transfer fluid from leaking out, and that the two contacting surfaces produce a sufficient electrical connection.

Alternatively, re-shaping procedures are also conceivable, such as for example embossing or deep-drawing procedures. A laser deposit welding procedure would be possible as a further alternative.

In a particularly advantageous manner, the bipolar plate is produced using a generative production method and the at least one heat pipe is integrated free of joining sites into the bipolar plate. Using modern generative production methods, it could be possible to produce a particularly weight-optimized bipolar plate, whereby it is not necessary to produce and install a separate heat pipe but rather it is integrated directly into the structure.

In one advantageous embodiment, the cooling section comprises an electrically insulating layer. In the case of increased air humidity or moisture between the cooling sections of multiple bipolar plates, there is the risk of voltage flashovers or leakage currents if the sections are very small. However, this may be reliably prevented by way of the electrically insulating layer. An anodized layer could possibly be provided when using aluminium materials to produce the bipolar plates. These could be coloured black in an advantageous variant with the result that a better dissipation of heat is ensured.

Moreover, the invention relates to a fuel cell system that comprises multiple fuel cells, wherein the fuel cells are arranged in alternating polarity and in pairs electrically connected to one another in each case by a bipolar plate according to the previous description. The fuel cells consequently form a stack or a fuel cell stack. In so doing, the cooling sections of all bipolar plates face in the same direction of the fuel cell stack with the result that these may be easily cooled by a common cooling system.

Moreover, the fuel cell system comprises a cooling system having a fluid channel through which is flowing the cooling medium and into which the cooling sections of the bipolar plates protrude. The fluid channel may be embodied in such a manner that all cooling sections of the bipolar plates may protrude into said fluid channel and that cooling medium may flow through them all. In a particularly simple case, air may be used as the cooling medium. This could possibly be realized in the form of the oxidant that is pre-heated by way of the cooling process prior to flowing into the fuel cells. However, fluid cooling media are also conceivable that may be used for constructing a compact fluid channel. This could comprise a closed wall arrangement with a fluid inlet that may be connected to a fluid source so as to supply fluid.

It is preferred that only each n-th bipolar plate comprises a cooling section, wherein n is a whole number in the range of 1 to 20. The cooling system thus renders it possible to cool the fuel cell system by way of a limited number of cooling sections in order to reduce the associated weight. It is conceivable by way of example that each second bipolar plate does not comprise a cooling section with the result that each fuel cell is cooled respectively only on one side.

In a further advantageous embodiment, spacers are arranged between successively following cooling sections. It is also possible in the case of very thin fuel cells to use the spacer to prevent the cooling sections from inadvertently contacting one another with the result that short circuits and leakage currents may be prevented.

Furthermore, the bipolar plates may be a multi-sector plate having multiple fuel cell sections that may be supplied independently with educts. The multi-sector plate could be used for the simple adaptation of the power output of the fuel cell with the result that in a purposeful manner only individual segments of the bipolar plate are supplied with educts. The multi-sector plate may provide heat pipes for each segment. Furthermore, heat pipes could also be arranged between individual segments.

The invention relates moreover to a vehicle that comprises at least one fuel cell system according to the above description. Furthermore, the vehicle may be an aircraft. A compact fuel cell system that is simple to cool is realized in said aircraft.

BRIEF DESCRIPTION OF THE DRAWINGS

Further features, advantages and application possibilities of the present invention arise from the description below of the exemplary embodiment and the figures. In so doing, all described and/or illustrated features form the subject matter of the invention as stand alone or in any combination and also independently of their composition in the individual claims or their back-references. Furthermore like reference numerals are used in the figures for like or similar objects.

DETAILED DESCRIPTION

Figure 1:
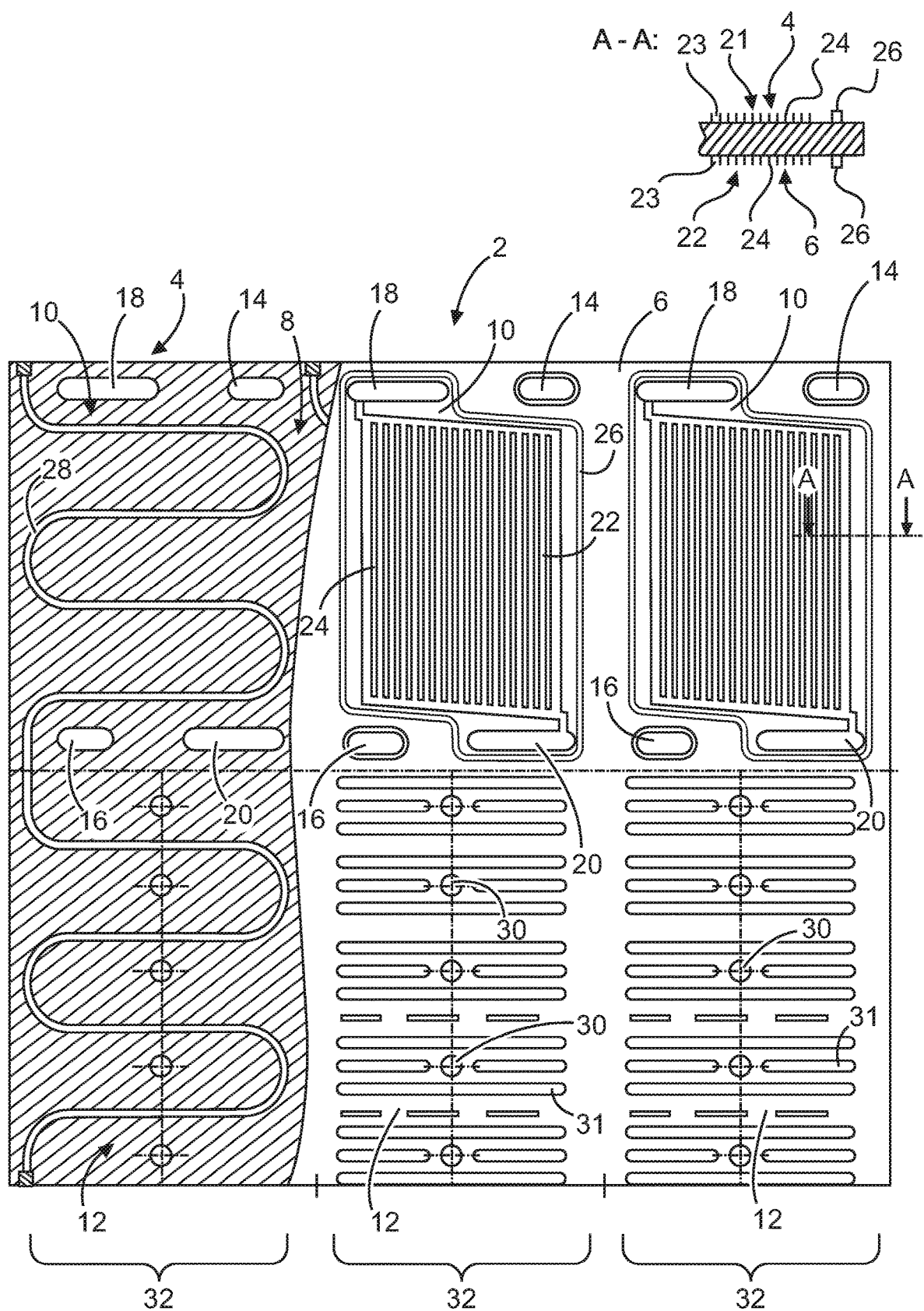
FIG. 1 illustrates a partial cross section of a first variant of a bipolar plate that is embodied as a multi-sector plate.
Figure 3:
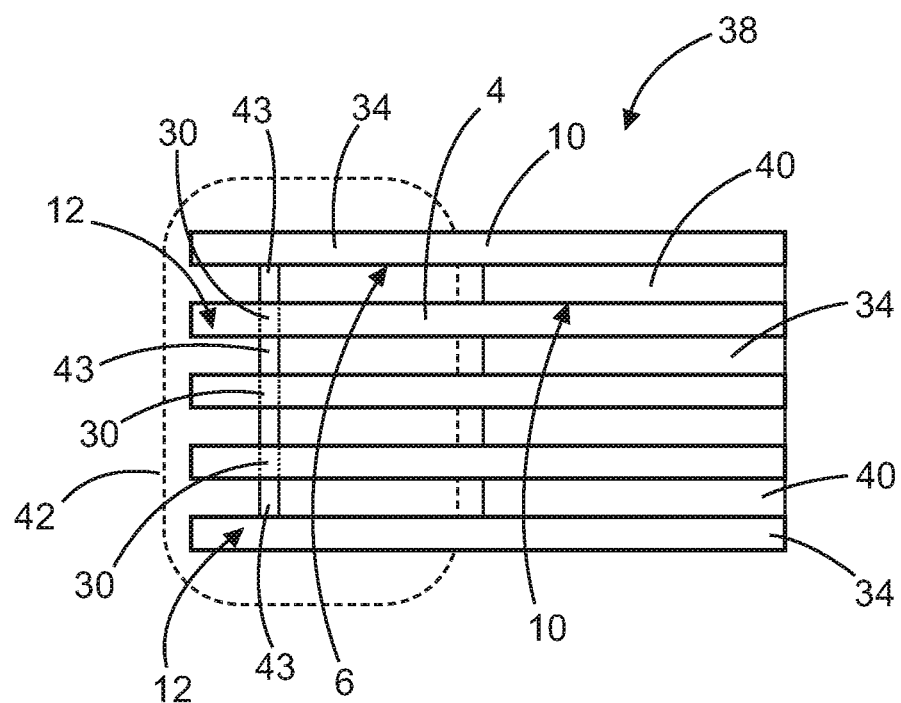
FIG. 3 illustrates a schematic view of a fuel cell system.

FIG. 1 illustrates a bipolar plate 2 for use in a fuel cell stack (illustrated in FIG. 3). The bipolar plate 2 comprises a first delimiting surface 4 (in this view the rear side) and a second delimiting surface 6 that is arranged parallel thereto. The two delimiting surfaces 4 and 6 are arranged spaced apart from one another and define thereby an intermediate space 8. This can be hollow in part. By way of example, the bipolar plate 2 could be produced from aluminium by means of a generative production method or by way of a procedure whereby material is removed.

The bipolar plate 2 comprises in this illustration three separate fuel cell sections 10, wherein in the drawing plane the left-hand fuel cell section 10 is only indicated on account of the partial cross section. A cooling section 12 is illustrated in each case in the drawing plane below each fuel cell section 10, wherein also in this case the left-hand cooling section 12 is likewise only indicated on account of the partial cross section.

The fuel cell sections 10 are provided so as to supply a fuel cell with educts. For this purpose, first educt supply channels 14 and first educt discharge channels 16 are provided. These may supply a flow field that is arranged in the first delimiting surface 4 with the educt that is to be supplied. Moreover, second supply channels 18 and second educt discharge channels 20 are provided. By way of the second educt supply channels 18, an educt passes into a second flow field 22 that comprises a row of webs 24 that are arranged parallel to one another and include or form depressions 23 with respect to one another. This produces a row of small flow channels that span a field or grid between the second educt supply channel 18 and the second educt discharge channel 20. If the bipolar plate 2 is attached to the fuel cell, the second flow field 22 covers one side of the fuel cell and consequently ensures a uniform distribution of the educt. For sealing purposes, each fuel cell section 10 may comprise a circumferential edge 26 that is likewise embodied as a web and produces a fluid-tight connection by means of pressing the bipolar plate 2 against the fuel cell.

In a similar manner, this construction applies for a first flow field 21 that is visible in this illustration only in a section view A-A since it is located in the first delimiting surface 4.

During the operation of the fuel cell, heat is produced in the fuel cell sections 10 and said heat must be discharged. A heat pipe 28 for each fuel cell section 10 is therefore provided in the bipolar plate 2 and said heat pipe runs in a meandering manner from the respective fuel cell section 10 to the respective cooling section 12. The heat pipe 28 supports the conduction of heat to the respective cooling sections 12. Since a meandering course is selected, heat is absorbed in the fuel cell sections 10 in a particular efficient manner and heat is discharged into the cooling sections 12 in a particularly efficient manner since the surface over which the heat pipe 28 passes or the run length of the heat pipe 28 is large.

The cooling section 12 extends from the respective fuel cell section 10 laterally outwards. If multiple bipolar plates 2 are installed in a fuel cell stack, a fuel cell stack is consequently formed on the fuel cell sections 10 while the cooling sections 12 of the individual bipolar plates 2 are then arranged spaced apart from one another. A cooling medium may flow through the gap that is produced on account of the spacing and said cooling medium absorbs the heat of the respective cooling section 12 and removes it from the bipolar plate 2. In order in this configuration to prevent the bipolar plates inadvertently making contact, each cooling section 12 comprises a row of bore holes 30 that are used to receive spacers.

Multiple furrows or grooves 31 are provided so as to improve the heat transfer in the cooling sections 12 to the respective cooling medium. These may cause a swirling action in the cooling medium which increases the heat transfer coefficient and in addition increases the effective surface area.

The bipolar plate 2 in FIG. 1 is embodied as a multi-sector plate that comprises multiple fuel cell sections 10. The bipolar plate 2 consequently comprises multiple adjacent sections 32. It is possible both to reduce and also increase the number of sectors 32. The aim of such a configuration is to operate or switch off a different number of fuel cell segments in a flexible manner in order to be able to accommodate different loading scenarios of a fuel cell stack.

Figure 2:
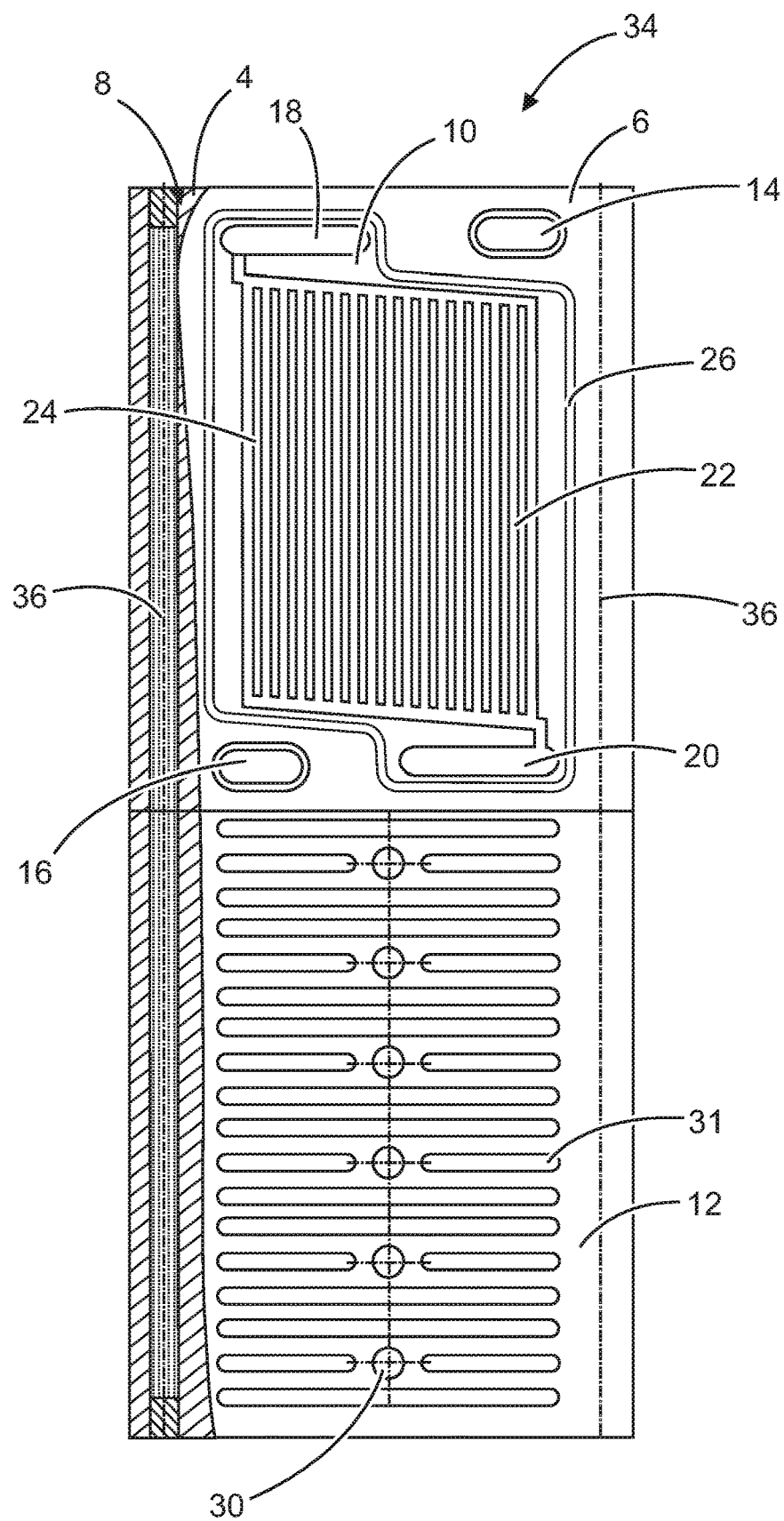
FIG. 2 illustrates a partial cross section of a second variant of a bipolar plate.

FIG. 2 illustrates a somewhat simplified variant of a bipolar plate 34 that comprises only an individual fuel cell section 10 and an individual cooling section 12. As a result, it is possible to operate an individual fuel cell or an individual fuel cell segment. It is possible to support the heat conduction from the fuel cell section 10 to the cooling section 12 by way of, for example, two heat pipes 36 that are embodied in a straight line and run parallel to one another. They are both arranged on opposite sides of the fuel cell section 10 and of the cooling section 12. Since the heat pipes 36 only extend along next to the fuel cell section 10 but do not pass through said fuel cell section, the bipolar plate 34 may consequently be embodied somewhat thinner than the bipolar plate 2 shown in FIG. 1.

FIG. 3 illustrates very schematically a fuel cell system 38 having multiple fuel cells 40 that are arranged in opposite polarity in each case between two bipolar plates 34. The fuel cell sections 10 are directly adjacent to the fuel cells 40. The cooling sections 12 are located spaced apart from one another and may be arranged in a fluid channel 42 that is indicated in the figure by a broken line. Cooling fluid flows through said fluid channel and thereby may absorb the heat from the cooling sections 12 and as a result cool the cooling sections 12. Spacers 43 may be arranged between the individual cooling sections 12. As illustrated in FIGS. 1 and 2, the spacers 43 may be attached to dedicated bore holes 30.

Figure 4:
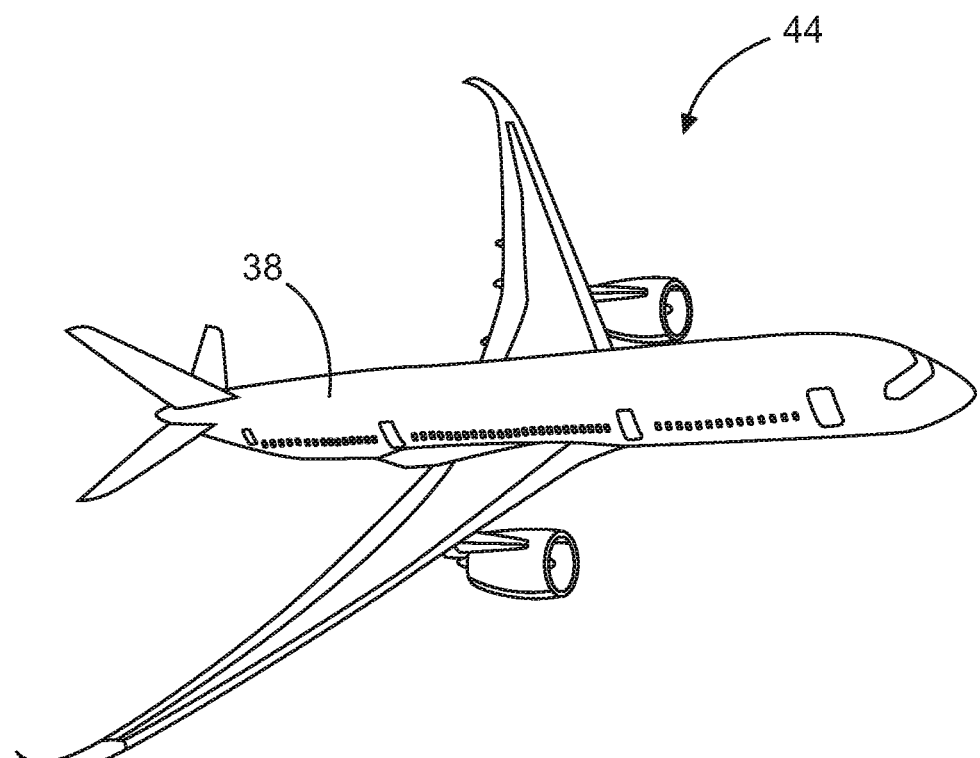
FIG. 4 illustrates an aircraft having a fuel cell system that is integrated therein.

Finally, FIG. 4 illustrates an aircraft 44 in which by way of example a fuel cell system 38 is arranged. This is particularly suitable for use in the aircraft 44 since a particularly compact construction is possible by way of the heat pipes.

In addition, it is to be mentioned that "comprising" does not exclude any other elements or steps and "a" does not exclude a multiplicity. Moreover, it is to be mentioned that features that have been described with reference to one of the above exemplary embodiments may also be used in combination with other features of other exemplary embodiments that are described above. Reference numerals in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

2 Bipolar plate
4 First delimiting surface
6 Second delimiting surface
8 Intermediate space
10 Fuel cell section
12 Cooling section
14 First educt supply channel
16 First educt discharge channel
18 Second educt supply channel
20 Second educt discharge channel
21 First flow field
22 Second flow field
23 Depression
24 Web
26 Edge
28 Heat pipe
30 Bore hole
31 Furrow/groove
32 Sector
34 Bipolar plate
36 Heat pipe
38 Fuel cell system
40 Fuel cell
42 Fluid channel
44 Aircraft

The invention claimed is:

1. A bipolar plate for use in a fuel cell stack, said bipolar plate comprising:
a first delimiting surface; and
a second delimiting surface arranged parallel to the first delimiting surface,
wherein the first and second delimiting surfaces are arranged spaced apart from one another and define an intermediate space,
wherein the bipolar plate comprises:
at least one fuel cell section having at least one flow field comprising depressions protruding into the intermediate space so as to make direct contact with a fuel cell, and
at least one cooling section extending from the at least one flow field along the first and second delimiting surfaces,
wherein at least one heat pipe is arranged in the intermediate space and extends from the at least one fuel cell section into the at least one cooling section so as to transfer heat from the fuel cell section into the cooling section.

2. The bipolar plate according to claim 1, wherein the cooling section is arranged on one side of the bipolar plate.

3. The bipolar plate according to claim 1, wherein the at least one heat pipe runs in a meandering manner in the bipolar plate.

4. The bipolar plate according to claim 1, wherein a section of the at least one heat pipe extends along at least a straight line.

5. The bipolar plate according to claim 1, wherein at least one of the at least one flow field is embodied so as to supply a fuel cell with an educt in the case of an educt pressure in the range of 0.5 to 0.7 bar absolute.

6. The bipolar plate according to claim 1, wherein the bipolar plate is produced in more than one part and by a production method whereby material is removed.

7. The bipolar plate according to claim 1, wherein the bipolar plate is produced using a generative production method and the at least one heat pipe is integrated free of joining sites into the bipolar plate.

8. The bipolar plate according to claim 1, wherein the cooling section comprises an electrical insulating layer.

9. A fuel cell system comprising multiple fuel cells, wherein the fuel cells are arranged in alternating polarity and in pairs electrically connected to one another in each case by a bipolar plate according to claim 1.

10. The fuel cell system according to claim 9, further comprising a cooling system having a fluid channel through which a cooling medium is configured to flow and into which the cooling sections of the bipolar plates protrude.

11. The fuel cell system according to claim 9,
wherein only each n-th bipolar plate comprises a cooling section, and
wherein n is a whole number in a range of 1 to 20.

12. The fuel cell system according to claim 9, wherein spacers are arranged between successively following cooling sections.

13. The fuel cell system according to claim 9, wherein the bipolar plate is a multi-sector plate having multiple fuel cell sections configured to be supplied independently with educts.

14. A vehicle, comprising at least one fuel cell system according to claim 9.

15. The vehicle according to claim 14, wherein the vehicle is an aircraft.

* * * * *